US011567099B2

(12) United States Patent
Gebru et al.

(10) Patent No.: US 11,567,099 B2
(45) Date of Patent: Jan. 31, 2023

(54) DEVICE AND METHOD FOR DETERMINING A ROTATIONAL FREQUENCY OF A ROTATING ROLLER BODY

(71) Applicant: Robert Bosch GmbH, Stuttgart (DE)

(72) Inventors: Minelik Gebru, Tuebingen (DE); Peter Bakucz, Klosterlechfeld (DE)

(73) Assignee: Robert Bosch GmbH, Stuttgart (DE)

( * ) Notice: Subject to any disclaimer, the term of this patent is extended or adjusted under 35 U.S.C. 154(b) by 954 days.

(21) Appl. No.: 16/326,448

(22) PCT Filed: Aug. 10, 2017

(86) PCT No.: PCT/EP2017/070325
§ 371 (c)(1),
(2) Date: Feb. 19, 2019

(87) PCT Pub. No.: WO2018/033473
PCT Pub. Date: Feb. 22, 2018

(65) Prior Publication Data
US 2021/0285979 A1    Sep. 16, 2021

(30) Foreign Application Priority Data

Aug. 19, 2016 (DE) .................... 10 2016 215 635.7

(51) Int. Cl.
*G01P 3/44* (2006.01)
*G01P 15/00* (2006.01)
(Continued)

(52) U.S. Cl.
CPC ............... *G01P 3/44* (2013.01); *G01C 19/54* (2013.01); *G01C 19/56* (2013.01); *G01C 21/10* (2013.01);
(Continued)

(58) Field of Classification Search
CPC .... G01P 3/44; G01P 3/00; G01P 3/443; G01P 3/48; G01P 3/50; G01P 1/023; G01P 7/00;
(Continued)

(56) References Cited

U.S. PATENT DOCUMENTS 6,466,887 B1    10/2002  Weinbrenner
2003/0042890 A1   3/2003  Normann et al.
(Continued)

FOREIGN PATENT DOCUMENTS

CH      681931      6/1993
CN      1054489 A   9/1991
(Continued)

OTHER PUBLICATIONS

International Search Report dated Jan. 12, 2018 of the corresponding International Application PCT/EP2017/070325 filed Aug. 10, 2017.

*Primary Examiner* — Amine Benlagsir
(74) *Attorney, Agent, or Firm* — Norton Rose Fulbright US LLP; Gerard Messina

(57) ABSTRACT

A device of or attached to a roller body determines a rotational frequency of the roller body (or other object) rotating about an axis of rotation includes an acceleration sensor that detects an acceleration signal of an acceleration in a first direction extending in a radial or tangential direction to the axis of rotation of the roller body; and an electronic processing unit and configured to low-pass and high-pass, particularly adaptively high-pass filter, the detected acceleration signal, perform a derivation, with respect to time, of the filtered signal, optimize the signal with a subsequent absolute-amount generation and with
(Continued)

moving averaging, and ascertain a frequency of the filtered acceleration signal, which corresponds to the rotational frequency of the roller body.

14 Claims, 4 Drawing Sheets

(51) Int. Cl.
*H04Q 9/00* (2006.01)
*G01P 3/48* (2006.01)
*G01P 3/50* (2006.01)
*G01P 3/00* (2006.01)
*G01P 7/00* (2006.01)
*G01C 19/56* (2012.01)
*G01C 21/10* (2006.01)
*G01P 1/02* (2006.01)
*G01C 19/54* (2006.01)
*G01P 15/08* (2006.01)

(52) U.S. Cl.
CPC ............... *G01P 1/023* (2013.01); *G01P 3/00* (2013.01); *G01P 3/443* (2013.01); *G01P 3/48* (2013.01); *G01P 3/50* (2013.01); *G01P 7/00* (2013.01); *G01P 15/00* (2013.01); *H04Q 9/00* (2013.01); *G01P 15/0802* (2013.01); *H04Q 2209/40* (2013.01)

(58) Field of Classification Search
CPC ..... G01P 15/00; G01P 15/0802; G01C 19/54; G01C 19/56; G01C 21/10; H04Q 9/00; H04Q 2209/40
See application file for complete search history.

(56) References Cited

U.S. PATENT DOCUMENTS

| | | | | |
|---|---|---|---|---|
| 2006/0288800 A1* | 12/2006 | Mukai | ................... | B62D 5/049 |
| | | | | 73/862.326 |
| 2011/0288720 A1* | 11/2011 | Huchard | ............ | B60C 23/0416 |
| | | | | 701/31.4 |
| 2012/0204627 A1* | 8/2012 | Anderl | ...................... | F04B 1/26 |
| | | | | 73/64.53 |
| 2013/0179113 A1 | 7/2013 | Guinart | | |
| 2015/0165835 A1* | 6/2015 | Peine | ................... | B60C 23/0459 |
| | | | | 340/447 |
| 2016/0200352 A1* | 7/2016 | Kezobo | ................... | H02P 21/20 |
| | | | | 180/446 |
| 2018/0355876 A1* | 12/2018 | Sase | ........................ | F02B 39/16 |

FOREIGN PATENT DOCUMENTS

| | | | | |
|---|---|---|---|---|
| CN | 2103816 | U | 5/1992 | |
| CN | 101027198 | A | 8/2007 | |
| CN | 101634659 | A | 1/2010 | |
| CN | 102279284 | A | 12/2011 | |
| CN | 102371860 | A | 3/2012 | |
| CN | 102590543 | A | 7/2012 | |
| CN | 105829832 | A | 8/2016 | |
| DE | 19728419 | | 2/1999 | |
| DE | 10012458 | | 9/2001 | |
| DE | 102007018238 | | 10/2008 | |
| DE | 102008036580 | | 2/2009 | |
| DE | 102010021186 | | 11/2011 | |
| DE | 102012110689 | | 5/2014 | |
| EP | 0517082 | A2 * | 12/1992 | ............... G01P 7/00 |
| GB | 2146775 | A * | 4/1985 | ............. G01P 15/18 |
| JP | 2009042196 | | 2/2009 | |
| JP | 2009042196 | A * | 2/2009 | |

* cited by examiner

DEVICE AND METHOD FOR DETERMINING A ROTATIONAL FREQUENCY OF A ROTATING ROLLER BODY

CROSS-REFERENCE TO RELATED APPLICATIONS

The present application is the national stage of International Pat. App. No. PCT/EP2017/070325 filed Aug. 10, 2017, and claims priority under 35 U.S.C. § 119 to DE 10 2016 215 635.7, filed in the Federal Republic of Germany on Aug. 19, 2016, the content of each of which are incorporated herein by reference in their entireties.

FIELD OF THE INVENTION

The present invention relates to a device for determining a rotational frequency of a roller body rotating about an axis of rotation, the device having a processing unit and being able to be fastened to the roller body. The present invention also relates to a roller body having at least one device for determining a rotational frequency, and to a method for determining the rotational frequency.

BACKGROUND

A device for determining the rotational frequency of a roller body is known from the published patent application DE 102007018238 A1, for instance. In this document, a magnet is attached to a rotating object, and the rotational frequency of the rotating object is then determined in such a way that during each rotation of the object, a pulse is detected with the aid of a sensor element, e.g., a Hall-effect sensor, and the rotational frequency of the object can be inferred from the time span between two pulses. The rotating object could be a roller body, for instance.

SUMMARY

According to an aspect of the present invention, a device for determining a rotational frequency of a roller body rotating about an axis of rotation includes an electronic processing unit and is able to be attached to the roller body. The device has an at least uniaxial acceleration sensor, and the processing device is configured to detect an acceleration signal of an acceleration in a first direction within a first time span with the aid of the acceleration sensor. The device can be attached to the roller body in such a way that the first direction runs in a radial direction with respect to the axis of rotation of the roller body, or that the first direction is oriented at a right angle to the axis of rotation and the radial direction.

In addition, the processing device is configured to filter the detected acceleration signal using a low-pass filter and a high-pass filter, in particular to adaptively filter it using a high-pass filter, in order to obtain a filtered acceleration signal. In addition, the processing unit is configured to ascertain a frequency of the filtered acceleration signal, this frequency corresponding to the rotational frequency of the roller body.

This has an advantage that an acceleration sensor can have a very small size, thereby allowing for a compact design of the device. In addition, the device is able to precisely determine the rotational frequency of metallic roller bodies as well because the measuring result of the acceleration sensor is barely or not at all affected by the metallic roller body when compared to a magnetic-field sensor. Moreover, because of the filtering, a cost-effective acceleration sensor that exhibits a certain noise can be used.

According to an example embodiment of the present invention, the processing unit is configured to determine a second time span between k adjacent zero crossings of the filtered acceleration signal and to ascertain the frequency as a function of the second time span, k being a positive whole number and the second time span representing k minus one half-period lengths of the filtered acceleration signal. This is advantageous insofar as it constitutes an uncomplicated possibility for determining the rotational frequency of the roller body, this applying especially to relatively constant rotational frequencies.

According to an example embodiment of the present invention, the processing unit is configured to determine a third time span between k adjacent maxima or minima of the filtered acceleration signal and to ascertain the frequency as a function of the third time span, k being a positive whole number, and the third time span representing k minus one period lengths of the filtered acceleration signal. This is advantageous insofar as it constitutes an uncomplicated possibility for determining the rotational frequency of the roller body, this applying especially to relatively constant rotational frequencies.

According to an example embodiment of the present invention, the processing unit is configured to mathematically derive the filtered acceleration signal with respect to time, to determine an absolute-value signal from the acceleration signal derived with respect to time, and to movingly average the absolute-value signal using a time constant, and the processing unit is configured to determine a fourth time span between k adjacent maxima of the movingly averaged absolute-value signal and to ascertain the frequency as a function of the fourth time span, k being a positive whole number and the fourth time span representing k minus one half-period lengths of the filtered acceleration signal.

It is advantageous in this context that the rotational frequency is able to be determined even in the presence of rapid changes in the rotational frequency. In addition, due to the derivation, the absolute-value generation and the smoothing with the aid of the moving average value, the filtered acceleration signal is able to be conditioned even more optimally in order to allow for a precise determination of the rotational frequency on that basis.

According to an example embodiment of the present invention, the processing unit is configured to detect a trigger signal and to determine the rotational frequency when such a trigger signal is detected. This has an advantage that the determination of the rotational frequency is able to be triggered in a selective manner when the need arises. Both an external and an internal trigger signal is possible.

According to an example embodiment, the device has a communications unit, in particular a wireless communications unit, and the processing unit is configured to output the determined rotational frequency with the aid of the communications unit. This has an advantage that an external unit is able to receive and further evaluate the rotational frequency.

According to an example embodiment of the present invention, a roller body includes at least one device as described. This offers an advantage that the rotational frequency of the roller body is easily able to be determined. Moreover, the device also has the capability of precisely determining the rotational frequency of a metallic roller body because the measuring result of the acceleration sensor is barely or not at all affected by the metallic roller body when compared to a magnetic-field sensor.

According to an example embodiment of the present invention, a method for determining a rotational frequency of a rotating roller body includes: (a) detecting an acceleration signal of an acceleration in a first direction within a first time span using an at least uniaxial acceleration sensor attached to the roller body, the first direction extending in a radial direction to the axis of rotation of the roller body or the first direction being aligned at a right angle to the axis of rotation and to the radial direction; (b) low-pass filtering and high-pass filtering, in particular adaptive high-pass filtering, the detected acceleration signal in order to obtain a filtered acceleration signal; and (c) ascertaining a frequency of the filtered acceleration signal, this frequency corresponding to the rotational frequency of the roller body.

This has an advantage that an acceleration sensor can have a very small size, thereby allowing for a compact design of the device. In addition, the device is able to accurately determine also the rotational frequency of metallic roller body because the measuring result of the acceleration sensor is barely or not at all affected by the metallic roller body when compared to a magnetic-field sensor. Moreover, because of the filtering, a cost-effective acceleration sensor which has a certain noise can be used.

According to an example embodiment of the present method, in method step c, a second time span is determined between k adjacent zero crossings of the filtered acceleration signal, whereupon the frequency is ascertained as a function of the second time span, k being a positive whole number and second time span representing k minus one half-period lengths of the filtered acceleration signal. This is advantageous insofar as it constitutes an uncomplicated possibility for determining the rotational frequency of the roller body, this applying especially to relatively constant rotational frequencies.

According to an example embodiment of the method according to the present invention, a third time span between k adjacent maxima or minima of the filtered acceleration signal is determined in method step c, whereupon the frequency is ascertained as a function of the third time span, k being a positive whole number, and the third time span representing k minus one period lengths of the filtered acceleration signal. This is advantageous insofar as it constitutes an uncomplicated possibility for determining the rotational frequency of the roller body, this applying especially to relatively constant rotational frequencies.

According to an example embodiment of the method according to the present invention, the filtered acceleration signal is mathematically derived with respect to time in method step c, whereupon an absolute-value signal is determined from the acceleration signal derived with respect to time and the absolute-value signal is movingly averaged using a time constant, whereupon a fourth time span between k adjacent maxima of the movingly averaged absolute-value signal is determined and the frequency is ascertained as a function of the fourth time span, k being a positive whole number and the fifth time span representing k minus one half-period lengths of the filtered acceleration signal. This has an advantage that the rotational frequency is able to be determined even in the presence of rapid changes in the rotational frequency. In addition, because of the derivation, the absolute-value generation, and the smoothing with the aid of the moving average value, the filtered acceleration signal is able to be conditioned in an even more optimal manner in order to then be able to determine the precise rotational frequency therefrom.

According to an example embodiment of the present invention, a method step $a_0$ is carried out prior to method step a, in which it is checked whether a trigger signal was detected, and it is continued with method step a only if this is the case. This offers an advantage that the rotational-frequency determination is able to be triggered in a selective manner when the need arises. Both an external and an internal trigger signal is possible.

According to an example embodiment of the method according to the present invention, it is provided that a method step d is carried out following method step c, in which the determined rotational frequency is output using a communications unit, in particular a wireless communications unit. This offers an advantage that an external unit is able to receive and further evaluate the rotational frequency.

DETAILED DESCRIPTION

Figure 1:
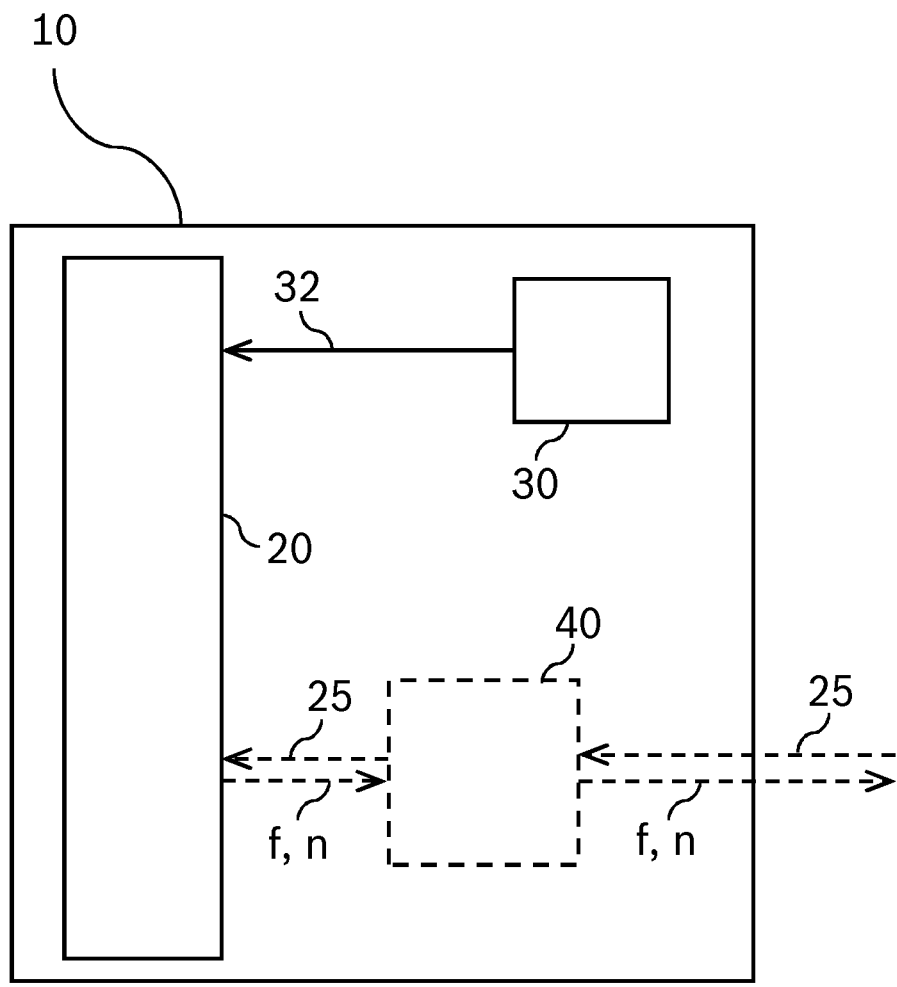
FIG. 1 shows a device for determining a rotational frequency of a roller body rotating about an axis of rotation, according to an example embodiment of the present invention.

FIG. 1 shows an example embodiment of a device according to the present invention for determining a rotational frequency of a roller body rotating about an axis of rotation. A device 10 includes an electronic processing unit 20 and an at least uniaxial acceleration sensor 30. Processing unit 20 can be developed as a microcontroller, for example. Acceleration sensor 30 is connected to processing unit 20 in such a way that processing unit 20 is able to detect at least one acceleration signal 32 of an acceleration in a first direction. In addition, processing unit 20 is developed to determine a filtered acceleration signal 33 filtered using a low-pass filter and a high-pass filter from detected acceleration signal 32, and furthermore to ascertain a frequency f of filtered acceleration signal 33, this frequency f corresponding to a rotational frequency n of a rotating roller body 100 to which device 10 is able to be attached.

Optionally, device 10 has a wireless communications unit 40. For example, communications unit 40 is a Bluetooth or WLAN unit and in particular is bidirectionally connected to processing unit 20. Processing unit 20 is configured to output determined rotational frequency n using communications unit 40 and to receive a trigger signal 25. Trigger signal 25 represents an instruction to determine rotational frequency n. Optionally, trigger signal 25 can also be output by a sensor, which is not shown, and thereby be detected by processing unit 20 when a measured value of the sensor exceeds a threshold value, for example.

Figure 2:
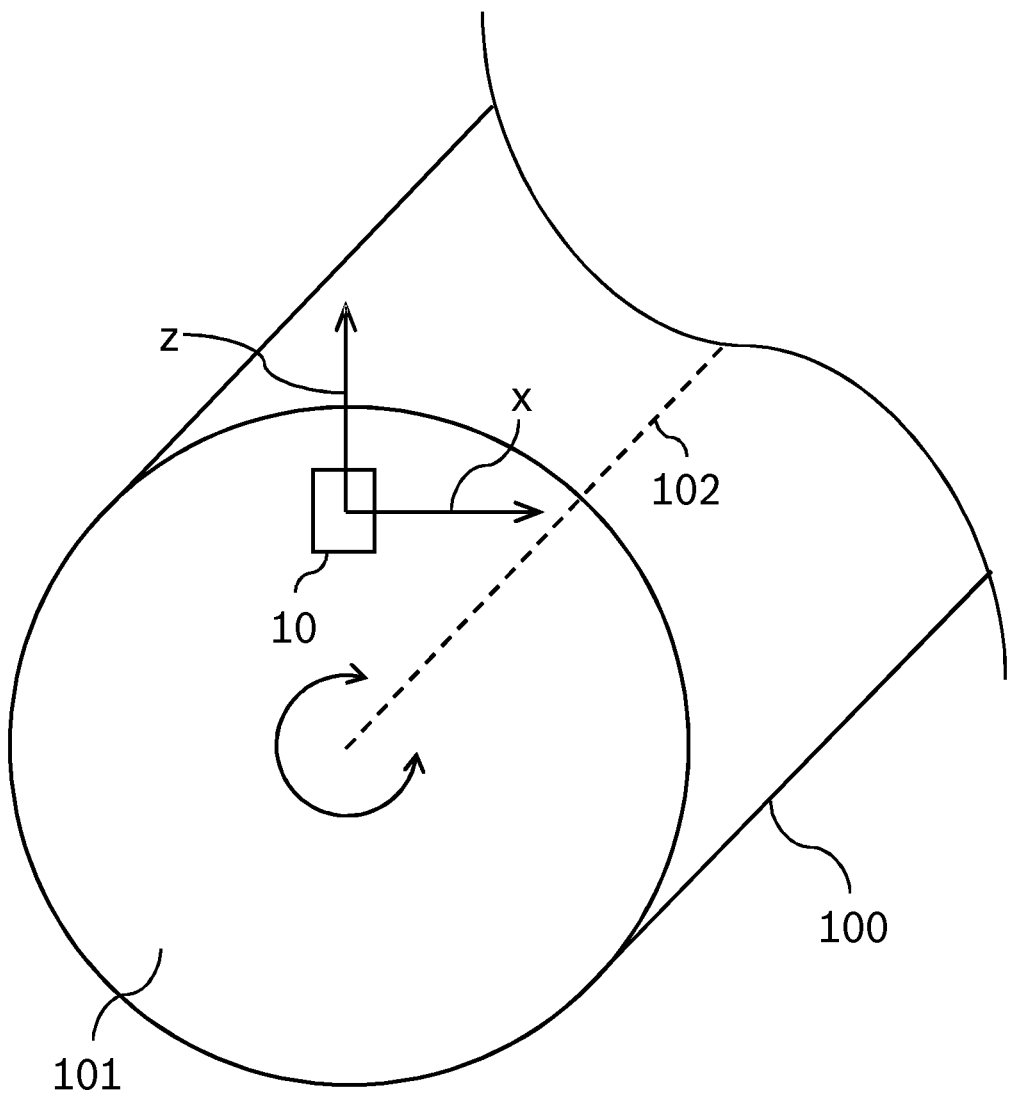
FIG. 2 shows a device attached to a roller body, according to an example embodiment of the present invention.

FIG. 2 shows an example of a device attached to a roller body 100, which is rotatable about an axis of rotation 102. Instead of a roller body, any other rotating object, such as a tire, is conceivable as well. Device 10, e.g., developed according to FIG. 1, is attached to an end face 101 of roller body 100 in such a way that the at least uniaxial acceleration sensor 30 is able to detect an acceleration in a first direction.

This first direction runs either in the radial direction with respect to axis of rotation 102, which corresponds to a z-direction in this instance, or else it runs both at a right angle to axis of rotation 102 and also to the radial direction, this corresponding to an x-direction in this instance. When roller body 100 is rotating, device 10 also rotates along with roller body 100, so that the x-z coordinate system is rotated as well. As an alternative, device 10 can also be situated inside roller body 100 provided the acceleration in the first direction is able to be detected.

Figure 3:
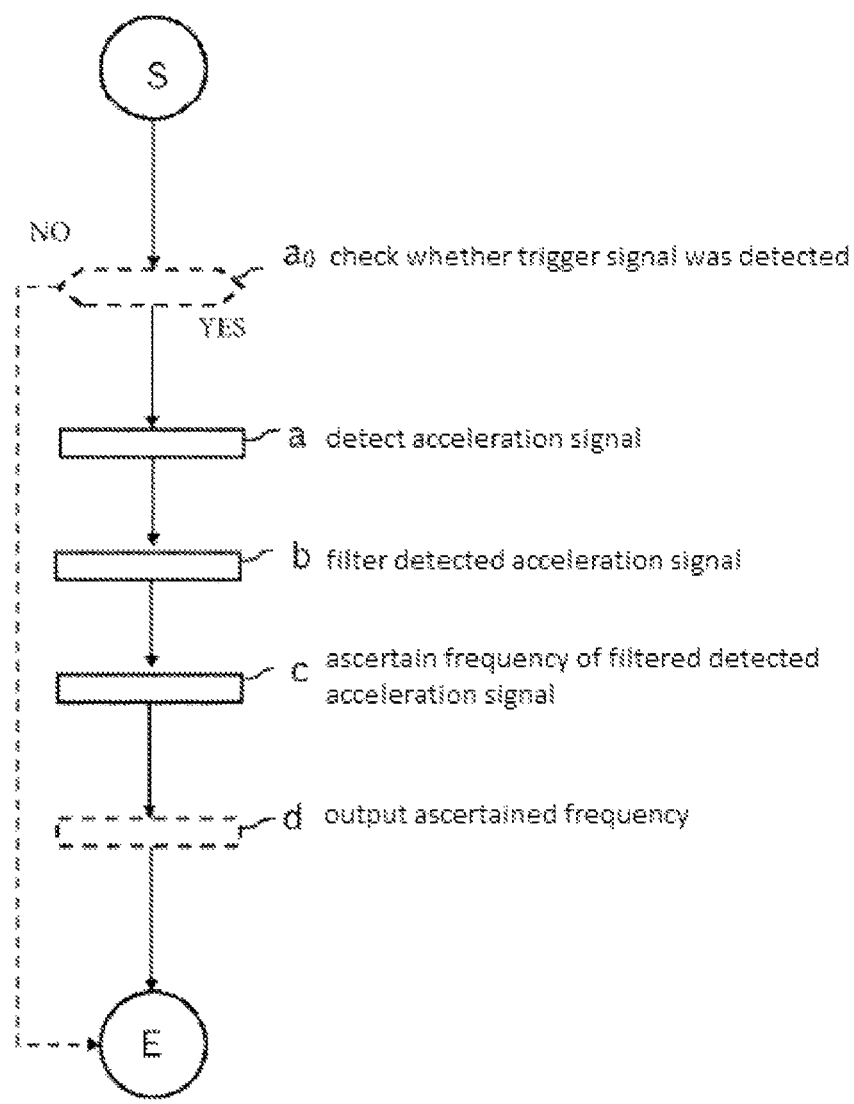
FIG. 3 is a flowchart that illustrates a method for determining a rotational frequency of a rotating roller body, according to an example embodiment of the present invention.

FIG. 3 illustrates a method for determining a rotational frequency of a rotating roller body according to an example embodiment of the present invention. To begin with, in a method step a, an acceleration signal 32 of an acceleration in a first direction within a first time span T1 is detected using an at least uniaxial acceleration sensor 30 attached to roller body 100, the first direction extending in a radial direction with respect to axis of rotation 102 of roller body 100, or the first direction being aligned at a right angle to axis of rotation 102 and to the radial direction. In comparison with FIG. 2, the acceleration is therefore detected either in the x- or in the z-direction.

In a method step b, detected acceleration signal 32 is low-pass filtered and then high-pass filtered, which results in a filtered acceleration signal 33. Detected acceleration signal 32 is adaptively high-pass filtered, in particular. This means that the filter constants are adapted as a function of the signal to be filtered. In a method step c, a frequency f of filtered acceleration signal 33 is then ascertained, this frequency f corresponding to rotational frequency n of roller body 100.

Frequency f can be ascertained in several ways. For example, a second time span T2 between k adjacent zero crossings of filtered acceleration signal 33 is able to be determined and the frequency then be determined as a function of second time span T2. For this purpose, it can be assumed that second time span T2 corresponds to k minus one half-period lengths of filtered acceleration signal 33. For example, if second time span T2 between two adjacent zero crossings is determined, then this second time span T2 corresponds to exactly one half of a period length of filtered acceleration signal 33. Frequency f is then easily determined by first calculating a full period length from the half-period length and then calculating the inverse value of the period length.

As an alternative, for example, a third time span T3 between k adjacent maxima or else between k adjacent minima of filtered acceleration signal 33 is able to be determined. Third time span T3 then corresponds to k minus one full period lengths. In a corresponding manner, frequency f can then be ascertained as previously described by generating the inverse value of a period length.

According to an alternative, filtered acceleration signal 33 is then derived with respect to time. The derived acceleration signal is subsequently converted into an absolute-value signal, which is realized by forming the individual absolute amount from the values of the derived acceleration signal, with the result that the absolute-value signal then has only positive values. This reduces the maximum sensitivity of the present method. Then, the absolute-value signal is movingly averaged using a time constant. The generation of the moving average value serves the purpose of smoothing the signal. The time constant can be selected in such a way that a rapid change in the rotational frequency is able to be taken into account. A typical time constant, for example, lies at 150 ms. The low-pass filtering, high-pass filtering, and the subsequent mathematical derivation of the signal with respect to time jointly constitute a type of band-pass filter, which, for example, allows a signal having a frequency of between 5 and 15 Hz to pass. This minimizes the influence of noise, interference, or drift of the signal so that the most precise rotational-frequency determination possible is able to be carried out. The filters are implemented as fast real-time recursive filters and use whole-number coefficients.

Optionally, a method step $a_0$ is additionally executed prior to method step a, in which it is checked whether a trigger signal 25 was detected by processing unit 20. If this is the case, it is continued with method step a. However, if no trigger signal 25 was detected, then the method can be terminated. Optionally, a method step d is also carried out following method step c, in which ascertained frequency f or rotational frequency n is output by processing unit 20 using communications unit 40, in particular in a wireless manner.

Figure 4:
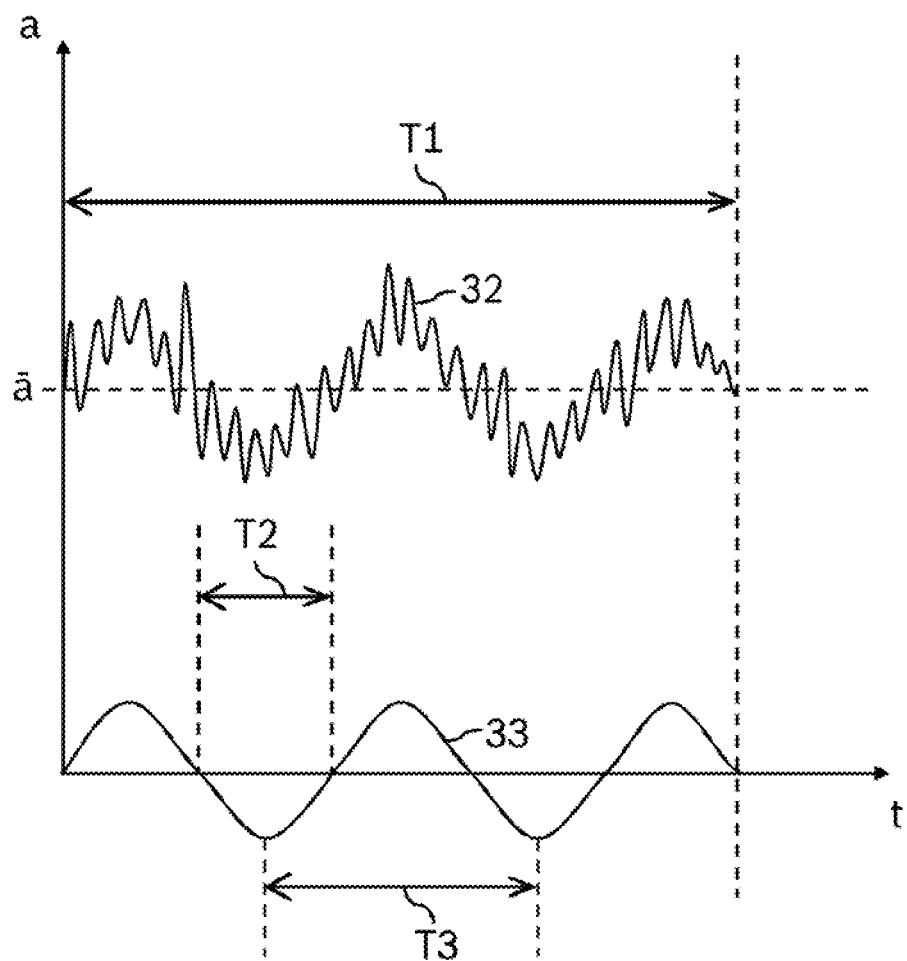
FIG. 4 shows a time characteristic of an acceleration signal detected using a device according to an example embodiment of the present invention, and a thereby filtered acceleration signal.

FIG. 4 illustrates a time characteristic of an acceleration signal detected using the method according to the present invention, and an acceleration signal that was filtered out therefrom. An acceleration-time diagram can be seen in which an acceleration signal 32 that was detected within a first time span T1 is shown. Acceleration signal 32 alternates around an average value $\bar{a}$ at a frequency f. This average value $\bar{a}$ stems from the rotational force that is acting on device 10 when roller body 100 is rotating. In contrast, the alternating component of detected acceleration signal 32 is generated due to the rotating coordinate system of device 10, which is why the gravitational force affects the detected acceleration signal in this way.

However, detected acceleration signal 32 could also still include drift, which is not shown here, and thus can move farther away from the base line over time.

The illustrated detected acceleration signal 32, for instance, can represent an acceleration according to FIG. 2 in the x-direction, which is measured by acceleration sensor 30. A corresponding acceleration signal of an acceleration in the z-direction, on the other hand, would be shifted by 90 degree with respect to illustrated acceleration signal 32. Due to the low-pass filtering and the high-pass filtering, a filtered acceleration signal 33 is obtained from detected acceleration signal 32. Filtered acceleration signal 33 includes less noise in comparison with detected acceleration signal 32. In addition, the constant component of detected acceleration signal 32 has been removed. A second time span T2 between two adjacent zeros of filtered acceleration signals 33 is shown. This second time span T2 represents half of a period length of filtered acceleration signal 33. In addition, a third time span T3 between two adjacent minima is shown, which represents a full period length of filtered acceleration signal 33. A corresponding third time span T3 could also be shown between two adjacent maxima.

The invention claimed is:

1. A device for determining a rotational frequency of a roller body rotating about an axis of rotation and to which the device is attachable, the device comprising:
   an acceleration sensor; and
   an electronic processor, wherein the processor is configured to:
   detect an acceleration signal of the acceleration sensor that occurs in a first time span and that corresponds to an acceleration that is in a first direction that extends (a) in a radial direction relative to the axis of rotation or (b) perpendicularly to the axis of rotation and to the radial direction;
   filter using a low-pass filter and a high-pass filter the detected acceleration signal to obtain a filtered acceleration signal; and ascertain a frequency of the filtered acceleration signal, which corresponds to the rotational frequency of the roller body,
wherein the processor is configured to:
mathematically derive the filtered acceleration signal with respect to time;
determine an absolute-value signal from the filtered acceleration signal derived with respect to time;
movingly average the absolute-value signal using a time constant;
determine a second time span between k adjacent zero crossings of the filtered acceleration signal;
ascertain the frequency of the filtered acceleration signal based on the second time span;
said k is a positive whole number;
the second time span represents said k minus one half-period lengths of the filtered acceleration signal;
determine a third time span between said k adjacent maxima or minima of the filtered acceleration signal;
ascertain the frequency of the filtered acceleration signal based on the third time span, and
the third time span represents said k minus one period lengths of the filtered acceleration signal.

2. The device of claim 1, wherein the high-pass filter is an adaptive high-pass filter.

3. The device of claim 1, wherein:
the processor is further configured to:
determine the second time span between said k adjacent maxima or minima of the filtered acceleration signal; and
ascertain the frequency of the filtered acceleration signal based on the second time span;
said k is a positive whole number; and
the second time span represents said k minus one period lengths of the filtered acceleration signal.

4. The device of claim 1, wherein the processor is further configured to detect a trigger signal and determine the rotational frequency of the roller body responsive to the detection of the trigger signal.

5. The device of claim 1, further comprising a communications unit, wherein the processor is further configured to output the determined rotational frequency of the roller body via the communications unit.

6. The device of claim 5, wherein the communications unit is a wireless communications unit.

7. A roller body comprising a device that is configured to determine a rotational frequency of the roller body when the roller body rotates about an axis of rotation, the device comprising:
an acceleration sensor; and
an electronic processor, wherein the processor is configured to:
detect an acceleration signal of the acceleration sensor that occurs in a first time span and that corresponds to an acceleration that is in a first direction that extends (a) in a radial direction relative to the axis of rotation or (b) perpendicularly to the axis of rotation and to the radial direction;
filter using a low-pass filter and a high-pass filter the detected acceleration signal to obtain a filtered acceleration signal; and
ascertain a frequency of the filtered acceleration signal, which corresponds to the rotational frequency of the roller body;
wherein the processor is configured to:
mathematically derive the filtered acceleration signal with respect to time;
determine an absolute-value signal from the filtered acceleration signal derived with respect to time;
movingly average the absolute-value signal using a time constant;
determine a second time span between k adjacent zero crossings of the filtered acceleration signal;
ascertain the frequency of the filtered acceleration signal based on the second time span;
said k is a positive whole number;
the second time span represents said k minus one half-period lengths of the filtered acceleration signal;
determine a third time span between said k adjacent maxima or minima of the filtered acceleration signal;
ascertain the frequency of the filtered acceleration signal based on the third time span, and
the third time span represents said k minus one period lengths of the filtered acceleration signal.

8. A method for determining a rotational frequency of a roller body rotating about an axis of rotation, the method comprising:
detecting an acceleration signal of an acceleration sensor of or attached to the roller body, wherein the acceleration signal occurs in a first time span and corresponds to an acceleration that is in a first direction that extends (a) in a radial direction relative to the axis of rotation or (b) perpendicularly to the axis of rotation and to the radial direction;
low-pass filtering and high-pass filtering the detected acceleration signal to obtain a filtered acceleration signal; and
ascertaining a frequency of the filtered acceleration signal, which corresponds to the rotational frequency of the roller body;
wherein the processor is configured to:
mathematically derive the filtered acceleration signal with respect to time;
determine an absolute-value signal from the filtered acceleration signal derived with respect to time;
movingly average the absolute-value signal using a time constant;
determine a second time span between k adjacent zero crossings of the filtered acceleration signal;
ascertain the frequency of the filtered acceleration signal based on the second time span;
said k is a positive whole number;
the second time span represents said k minus one half-period lengths of the filtered acceleration signal;
determine a third time span between said k adjacent maxima or minima of the filtered acceleration signal;
ascertain the frequency of the filtered acceleration signal based on the third time span, and
the third time span represents said k minus one period lengths of the filtered acceleration signal.

9. The method of claim 8, wherein:
the ascertaining of the frequency of the filtered acceleration signal based on the second time span includes:
determining the second time span between said k adjacent maxima or minima of the filtered acceleration signal; and
the ascertaining the frequency of the filtered acceleration signal based on the second time span;
said k is a positive whole number; and
the second time span represents said k minus one period lengths of the filtered acceleration signal.

10. The method of claim 8, wherein:
the ascertaining of the frequency of the filtered acceleration signal based on the second time span includes:

determining the second time span between said k adjacent maxima or minima of the filtered acceleration signal; and the ascertaining the frequency of the filtered acceleration signal based on the second time span;

said k is a positive whole number; and the second time span represents said k minus one period lengths of the filtered acceleration signal.

11. The method of claim 8, further comprising:

detecting a trigger signal, wherein the rotational frequency of the roller body is determined responsive to the detection of the trigger signal.

12. The method of claim 8, further comprising outputting the determined rotational frequency of the roller body via a communications unit.

13. The method of claim 12, wherein the communications unit is a wireless communications unit.

14. The method of claim 8, wherein said high-pass filtering is performed with an adaptive high-pass filter.

* * * * *